United States Patent
Clarke

(10) Patent No.: US 9,476,739 B2
(45) Date of Patent: Oct. 25, 2016

(54) INDICATOR DEVICE

(76) Inventor: Stephen William Clarke, Clitheroe (GB)

( * ) Notice: Subject to any disclaimer, the term of this patent is extended or adjusted under 35 U.S.C. 154(b) by 0 days.

(21) Appl. No.: 13/984,511

(22) PCT Filed: Feb. 6, 2012

(86) PCT No.: PCT/GB2012/050251
§ 371 (c)(1),
(2), (4) Date: Sep. 10, 2013

(87) PCT Pub. No.: WO2012/107743
PCT Pub. Date: Aug. 16, 2012

(65) Prior Publication Data
US 2013/0341413 A1    Dec. 26, 2013

(30) Foreign Application Priority Data
Feb. 8, 2011   (GB) .................................. 1102156.5

(51) Int. Cl.
*G06K 19/06* (2006.01)
*G01D 7/00* (2006.01)
(Continued)

(52) U.S. Cl.
CPC ........... *G01D 7/00* (2013.01); *G06K 19/07749* (2013.01); *G09F 3/0297* (2013.01); *G09F 3/204* (2013.01); *G09F 7/10* (2013.01)

(58) Field of Classification Search
CPC  G01D 7/00; G06K 19/07749; G09F 3/0297; G09F 3/0204; G09F 7/10
USPC ........................................ 235/376, 385, 492
See application file for complete search history.

(56) References Cited

U.S. PATENT DOCUMENTS

| 2,497,285 A | 2/1950 | Allardice |
| 2,630,096 A | 3/1953 | Conley |

(Continued)

FOREIGN PATENT DOCUMENTS

| GB | 1459845 A | 5/1974 |
| GB | 2435731 A | 9/2007 |

(Continued)

OTHER PUBLICATIONS

International Search Report—PCT/GB2012/050251.
(Continued)

*Primary Examiner* — Paultep Savusdiphol
(74) *Attorney, Agent, or Firm* — Ronald E. Prass, Jr.; Prass LLP

(57) ABSTRACT

An indicator device comprises a first slide member (22) mounted on a planar base (1). The first slide member (22) is displaceable between a first position in which it reveals a first status indicating area (26) indicative of a first condition or state and a second position in which it reveals a second status indicating area (28) indicative of a second condition or state. A second slide member (30) is mounted on the base (10) and is displaceable into and across the path of the first indicator member (22) when the first indicator member is in the first position, to inhibit displacement of the first indicator member. The second indicator member (30) is displaceable between a first position in which it does not inhibit the displacement of the first indicator member (22) and a second position in which it inhibits the displacement of the first indicator member to its second position. The device may also be provided with one or more RFID tags (80, 82, 84) to permit remote monitoring of the status of the device. The device can be used, for example, in conjunction with a dispenser (60) to provide an indication of when stock needs to be reordered and whether reordering of the stock has taken place.

15 Claims, 4 Drawing Sheets

Figure 1:
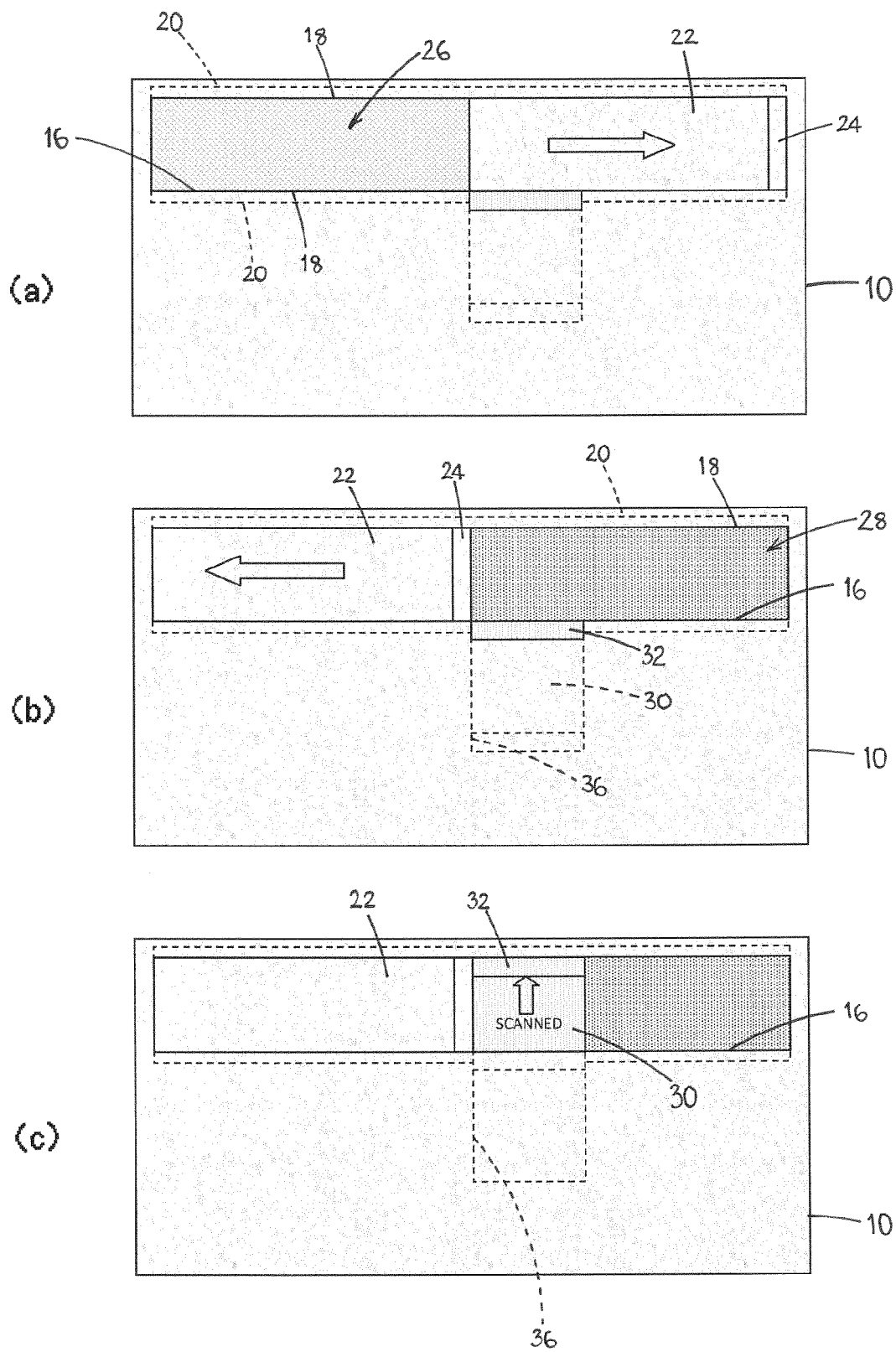

(51) Int. Cl.
*G09F 3/00* (2006.01)
*G09F 3/20* (2006.01)
*G09F 7/10* (2006.01)
*G06K 19/077* (2006.01)

(56) References Cited

U.S. PATENT DOCUMENTS

| | | | | |
|---|---|---|---|---|
| 4,654,990 A | | 4/1987 | Suters | |
| 6,121,544 A | * | 9/2000 | Petsinger | G06K 19/005 150/147 |
| 6,127,938 A | * | 10/2000 | Friedman | G08G 1/017 206/720 |
| 7,146,246 B2 | * | 12/2006 | Clarke | 700/236 |
| 7,388,501 B2 | * | 6/2008 | Tang | G06K 7/10346 340/10.1 |
| 7,598,868 B2 | * | 10/2009 | Lee | G08B 13/2402 200/61.93 |
| 7,719,425 B2 | * | 5/2010 | Colby | G06K 19/025 235/375 |
| 7,753,272 B2 | * | 7/2010 | Harper | G06Q 10/087 235/382 |
| 8,851,386 B2 | * | 10/2014 | Phillips | H05K 9/002 206/38 |
| 2004/0144794 A1 | * | 7/2004 | Clarke | 221/2 |
| 2007/0040030 A1 | * | 2/2007 | Kranzley et al. | 235/451 |
| 2007/0063847 A1 | * | 3/2007 | Lee | G08B 13/2402 340/572.1 |
| 2007/0150092 A1 | * | 6/2007 | Ohmura et al. | 700/231 |
| 2008/0143524 A1 | * | 6/2008 | Marusak | G08B 13/08 340/545.8 |
| 2008/0283531 A1 | * | 11/2008 | Clarke | 220/478 |
| 2008/0303632 A1 | * | 12/2008 | Hammad | G06F 1/1616 340/10.1 |
| 2010/0182764 A1 | * | 7/2010 | Phillips | H05K 9/002 361/816 |
| 2010/0193538 A1 | * | 8/2010 | Clarke | 221/6 |
| 2012/0228961 A1 | * | 9/2012 | Ito | H03K 17/965 307/104 |

FOREIGN PATENT DOCUMENTS

| | | |
|---|---|---|
| GB | 2454363 A | 5/2009 |
| WO | 2005104024 A1 | 11/2005 |
| WO | 2007021862 A2 | 2/2007 |
| WO | 2008155575 A1 | 12/2008 |

OTHER PUBLICATIONS

Written Opinion—PCT/GB2012/050251.
Search Report from United Kingdom Intellectual Property Office on UP 1102156.5.
UKIPO Search and Examination Report in GB1102156.5 dated Nov. 19, 2015.

* cited by examiner

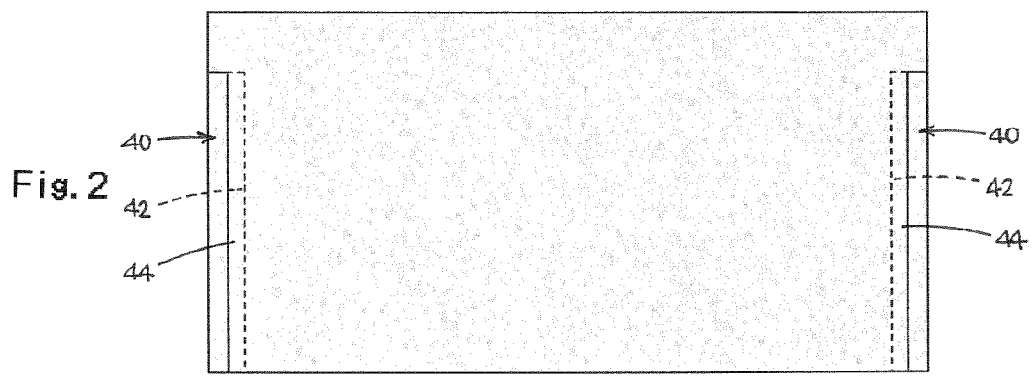
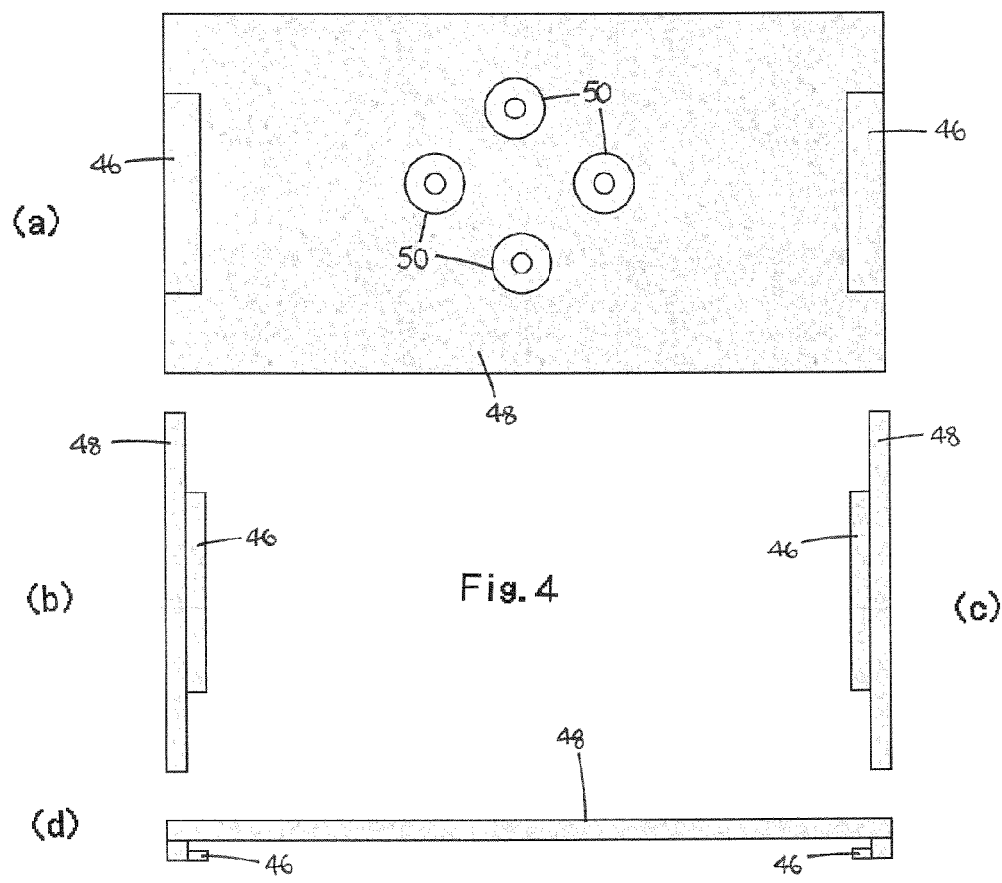

INDICATOR DEVICE

The present invention relates to indicator devices and in particular, but not exclusively, to indicator devices for indicating the status of dispensing devices.

In engineering workshops and on production lines and the like, it is often the case that many components are needed very frequently during manufacture or assembly. For example in a production line for a major part (e.g. a wing) of an aircraft, it may be necessary for many different types and sizes of rivets to be repeatedly used in the construction of the part.

To facilitate manufacture or assembly it is common practice for frequently-used components to be stored in a series of open trays or bins. When a particular component is required it is necessary merely to reach into one of the trays or bins and select the appropriate component.

One of the problems with such an arrangement is the inadvertent mixing of components, whereby an incorrect component may inadvertently be dropped into the wrong tray or bin with the result with the result that the wrong component may be selected at some time in the future.

Whilst the above disadvantage can to a great extent be overcome by providing lidded trays or bins for the components, there is another problem which to date has not been satisfactorily overcome.

Because the components in question are required very frequently, it is necessary to have a relatively large stock to ensure that production can continue. If this does not occur then the production of the whole article may temporarily terminate as a result of the absence of one particular component. Thus, it is common for a stock control person to monitor the level of each component. When the level of a component falls below a desired level the stock control person merely locates the appropriate components from the stores and then fills up the appropriate tray or bin with the components.

One significant disadvantage is that such practices inevitably result in a "residue" of components at the base of the tray or bin which never get used or which only get used after a very long period of time.

This increases the likelihood of damage to the components before they are fitted.

Moreover, it will be observed that with the existing practice different batches of components are mixed together, which makes it very difficult to trace the source of a particular component should this be necessary. One consequence of this is that if a particular component is found to fail a test when in position on the finished article, then it is necessary to test all of the identical components on the article since it is impossible to determine from which batch each component originated.

To a large extent, the above problems have been overcome by use of a dispensing device such as that shown in GB-A-2 327 668. The dispensing device shown in that document comprises an upper, loading chamber and a lower, dispensing chamber separated by means of a slidable planar gate. Products are taken from the lower, dispensing chamber but when the dispensing chamber is empty the gate is slid outwards to allow a further supply of products to fall from the upper, loading chamber into the dispensing chamber. The upper, loading chamber is then restocked with product so that the lower chamber can be refilled when it becomes empty again thereby ensuring that there is always product available in the dispenser.

However, the above dispenser relies on the upper, loading chamber being refilled whenever it is empty, to ensure that there is always an adequate supply of products for use.

It is an object of the present invention to provide an indicating device which indicates clearly when the upper, loading chamber requires refilling and, preferably, which also indicates when the necessary action has been taken to obtain the necessary products for refilling the upper, loading chamber.

In accordance with the present invention, an indicator device comprises:

a first indicator member displaceable between a first position indicative of a first condition or state and a second position indicative of a second condition or state;

a second indicator member displaceable into the path of the first indicator member when the first indicator member is in the first position to inhibit displacement of the first indicator member to the second position.

If the above indicator device is used in conjunction with a dispenser such as that described in GB-A-2 327 668, when the upper, loading chamber is emptied, by withdrawing the gate to allow products to fall into the lower, dispensing chamber, the person withdrawing the gate will move the first indicator member from a first position (e.g. indicating that the upper chamber is full) to a second position (e.g. indicating that the gate has been withdrawn and that the upper chamber is now empty). This indicates that the upper, loading chamber needs to be refilled.

When the person responsible for checking whether the upper chamber is empty sees that the first indicator member has been displaced to a second position, it serves as an alert that the upper, loading chamber requires refilling. That person can then take the appropriate action to order the necessary stock and when the necessary action has been taken, the second indicator member is displaced into the path of the first indicator member. This provides an indication to users of the dispenser that the relevant person is aware that the upper, loading chamber is empty but that it will soon be refilled. The displacement of the second indicator member into the path of the first indicator member also prevents the first indicator member from being inadvertently moved to the previous position.

Preferably, the second indicator member is displaceable between a first position in which it does not inhibit the displacement of the first indicator member and a second position in which it inhibits the displacement of the first indicator member to its second position.

Preferably, the second position of the second indicator member is indicative of a third condition or state.

In a preferred embodiment, the first indicator member is displaceable in a straight line between its first and second positions.

Preferably, the second indicator member is displaceable in a straight line between its first and second positions.

In a preferred embodiment, the first and second indicator members are both displaceable in a straight line between their respective first and second positions and the second indicator member is displaceable in a direction perpendicular to the direction of displacement of the first indicator member.

In a preferred embodiment, the first and second slide members are displaceable manually.

The indicator device may comprise a base on which the first and second indicator members are mounted.

In a preferred embodiment, the first indicator member is slidable between its first and second positions.

In a preferred embodiment, the second indicator member is slidable between its first and second positions.

Preferably, the first indicator device reveals a first indicator when it is in its first position.

Preferably, the first indicator device reveals a second indicator when it is in its second position.

Preferably, the second indicator device reveals a third indicator when it is displaced into the path of the first indicator device.

One or more of first, second and third indicators are preferably visual.

In one embodiment, the indicator device comprises an electronic tag adapted to transmit readable information to an interrogation device and further comprises shielding means which prevents communication with the electronic tag when the first indicator means is in its first position.

By using an electronic tag, it is possible to ascertain the condition or state of the indicator member without the requirement for visual inspection.

The indicator device may further comprise an electronic tag adapted to transmit readable information to an interrogation device and further comprising a shielding means which prevents communication with the electronic tag when the first indicator means is in its second position.

Preferably, the first indicator means comprises shielding means.

The indicator may further comprise an electronic tag adapted to transmit readable information to an interrogation device and further comprising shielding means which prevents communication with the electronic tag when the second indicator means is in one of its first and second positions.

The electronic tag is preferably adapted to transmit information indicative of a condition or state.

Preferably, the first and second indicator members are reversibly displaceable between their first and second positions.

Preferably, the second indicator member is displaceable across the path of the first indicator member when the first indicator member is in the first position, to inhibit displacement of the first indicator member to the second position.

Preferably, the first indicator member is displaceable across the path of the second indicator member when the second indicator member is not displaced into the path of the first indicator member, to inhibit displacement of the second indicator member into the path of the first indicator member.

Figure 5:
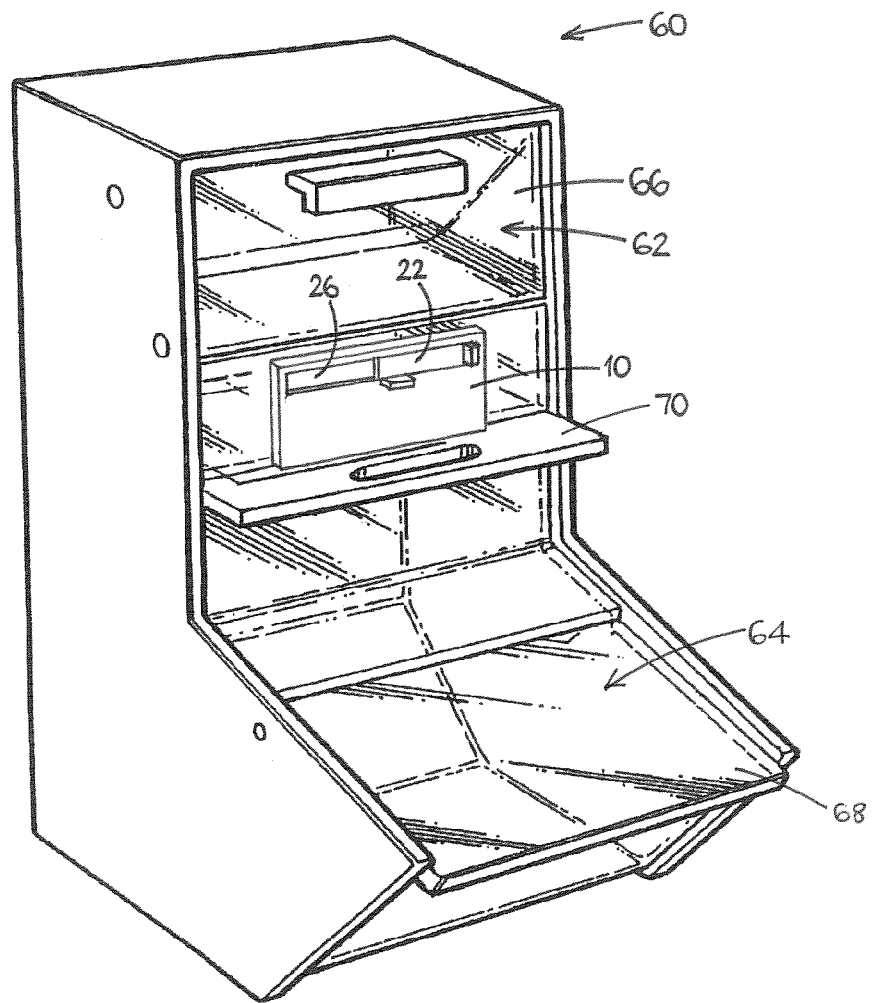

By way of example only, specific embodiments of the present invention will now be described with reference to the accompanying drawings, in which:

FIGS. 1(a) to 1(c) are front views of an embodiment of status indicating device in accordance with the present invention, shown in first, second and third conditions respectively;

FIG. 2 is a rear view of the status indicating device of FIG. 1;

FIGS. 3(a) to 3(c) are opposite end views respectively of the status monitoring device of FIG. 1(a);

FIGS. 4(a) to 4(d) are a front view, opposite end views and a top view respectively of a bracket for mounting the status indicating device of FIG. 1;

FIG. 5 is a perspective view of a dispenser fitted with the indicating device of FIG. 1; and FIGS. 6(a) to 6(c) are front views of a modification of the indicating device of FIG. 1, shown in first, second and third conditions respectively.

Referring firstly to FIGS. 1 to 3, a status indicating device comprises a rectangular, planar body 10 formed from a front plastics rectangular sheet 12 which is secured by radio-frequency welding to a rear plastics rectangular sheet 14. An elongate rectangular slot 16 is provided in the front sheet 12 of the body 10, adjacent to the upper edge of the front sheet, and extending parallel to the upper edge. The longitudinally extending edges 18 of the slot 16 are provided with an undercut, indicated at 20 in FIG. 1(a), by means of which a first rectangular, plastics slide member 22 is reversibly slidably mounted in, and retained in, the slot 16. The first slide member 22 is of the same thickness as the upper sheet 12, so that its outer face is level with the outer face of the upper sheet 12, except for a projecting finger tab 24 at its right-hand end, to facilitate manual sliding of the slide member 22.

The first slide member 22 is reversibly slidable between a first extreme position, shown in FIG. 1(a), in which its right-hand end abuts the right-hand end of the slot 16, and a second extreme position, shown in FIGS. 1(b) and 1(c), in which its left-hand end abuts the left-hand end of the slot 16. The first slide member 22 is half the length of the slot 16. When the first slide member 22 is moved to the first extreme position (FIG. 1(a)), a first status indicating area 26 is revealed and similarly in the second extreme position (FIGS. 1(b) and 1(c)) a second status indicating area 28 is revealed. For example, the first and second status indicating areas 26, 28 may be coloured green and red respectively or may comprise wording, symbols of other means of identifying a status.

The status indicating device also comprises a second rectangular, plastics slide member 30. The second slide member is generally rectangular and planar, with the exception of a finger tab 32 at its upper end, for facilitating manual sliding of the slide member. The second slide member 30 is reversibly slidably disposed in a complementarily-shaped recess 36 in the rear face of the upper sheet 12 of the body 10. The thickness of the slide member 30 is half that of the upper sheet 12 and the depth of the recess 36 is half the thickness of the upper sheet 12, so that the rear face of the second slide member 30 is level with the rear face of the upper sheet 12. If the first and second status indicating areas 26, 28 are coloured (e.g. green and red) the second slide member is preferably of a different colour (e.g. yellow) to indicate a different status, as will be explained.

The second slide member 30 is reversibly slidable in a direction inclined to (in this embodiment, perpendicular to) the sliding direction of the first slide member and is slidable into and across the path of the first sliding member. The left-hand edge of the second slide member (and of the recess 36 in which it is mounted) is located half way along the slot 16. Consequently, when the first slide member 22 is in its first extreme position, shown in FIG. 1(a), the second slide member is prevented from sliding as its upper edge abuts the lowermost edge of the first slide member 22, i.e. the first slide member 22 is in a position in which it has been slid across the path of the second slide member 30. Only when the first slide member 22 is moved to its second extreme position, shown in FIG. 1(b), out of the path of the second slide member 30, is it possible to slide the second sliding member 30 across the slot 16, as shown in FIG. 1(c). As the second sliding member 30 is slid across the slot 16 and across the path of the first slide member 22, its left-hand edge slides against, and abuts, the right-hand end of the first slide member, thereby preventing the first slide member from sliding along the slot 16. The second slide member may also bear additional visual information, such as the word "SCANNED", which is visible only when it is slid across the slot 16.

As seen in FIGS. 2 and 3, the end edges of the rear plate 14 are cut away, at 40, except at their upper ends, and are also provided with an undercut 42, thereby forming elongate securing flanges 44 extending parallel to the short edges of the plate 14. The flanges 44 are slidably engageable with overhanging securing flanges 46 on the front face of a rectangular plastics mounting bracket 48 of the same external dimensions as the body 10 of the status indicating device. The mounting bracket is provided with four countersunk holes 50 for receipt of securing screws (not shown).

In use, the mounting bracket 48 is secured in position e.g. on the front face of a dispenser 60 for fasteners as shown in FIG. 5, by means of screws passing through the holes 50 in the mounting bracket 48. The status indicating device is then slid onto the mounting bracket by aligning the undercut 42 of the rear plate 14 with the securing flanges 46 of the mounting bracket 48 and pushing downwardly until the shoulders formed by the upper ends of the undercuts 42 engage the uppermost ends of the securing flanges 46 of the mounting bracket 48. In this position, the status indicating device completely overlies and covers the mounting bracket 48.

The dispenser 60 is as described in GB 2435731A and comprises an upper, loading chamber 62 and a lower, dispensing chamber 64 (accessible by means of upper and lower hinged access doors 66, 68 respectively) separated by means of a slidable planar gate 70, and is typically used to store and dispense fasteners such as bolts or the like. Products are taken from the lower, dispensing chamber 64, but when the dispensing chamber is empty, the gate 70 is slid outwards to allow a further supply of products to fall from the upper, loading chamber 62 into the dispensing chamber. As the products are used, the upper, loading chamber is restocked with product so that the lower chamber can be refilled when it becomes empty.

If the dispenser 60 does not require refilling (i.e. the upper chamber 62 is still full), the second slide member 30 is slid to its retracted position and the first slide member 22 is slid to its first extreme position, as shown in FIG. 1(a) and FIG. 5. This causes the first status indicating area 26 (e.g. coloured green) to be displayed, indicating that the dispenser does not require refilling.

When it becomes necessary to refill the dispenser 60, the first slide member 22 is slid manually to its second extreme position, as shown in FIG. 1(b). This causes the second status indicating area 28 (e.g. coloured red) to be displayed, thereby providing an alert that the dispenser requires refilling.

When the person responsible for re-ordering the stock for the dispenser becomes aware that re-filling is required and has taken the necessary steps to do so (e.g. by re-ordering the relevant components) the second slide member 30 is slid upwardly across the slot 16 as shown in FIG. 1(c). This serves as confirmation to the users of the dispenser that the relevant person is aware that the dispenser requires refilling and has taken the steps necessary to do so. If the re-ordering involves scanning a barcode or other identifying mark on the dispenser, the second slid member 30 can also indicate that the barcode or identifying mark has been scanned, e.g. by displaying the word "SCANNED" when displaced upwardly, as shown in FIG. 1(c). As explained previously, when the second slide member 30 is slid upwardly across the slot 16 as shown in FIG. 1(c), its left-hand edge abuts the right-hand end of the first slide member 22 and prevents the first slide member 22 from moving.

Figure 6:
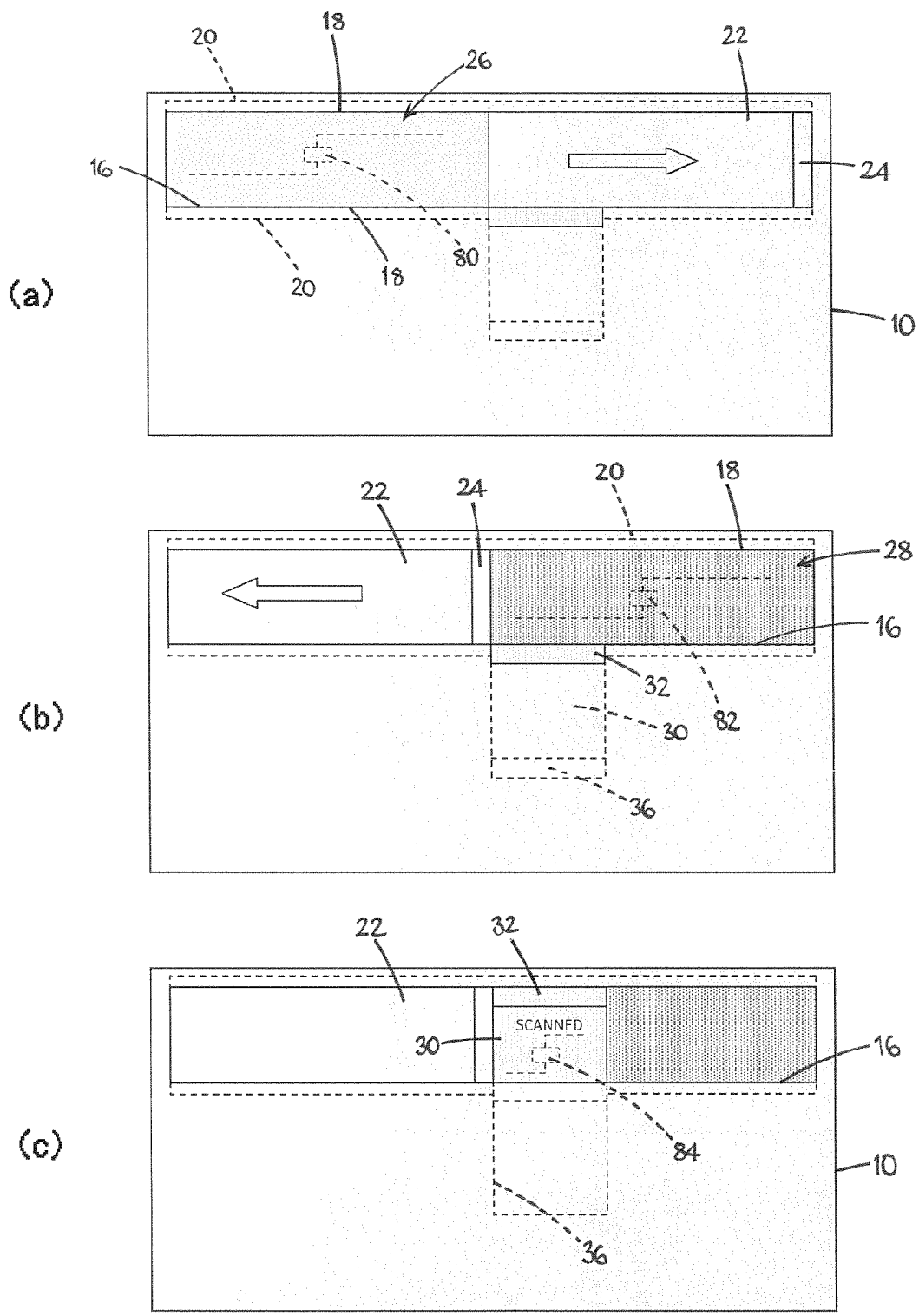

A modification to the indicating device of FIG. 1 is illustrated in FIG. 6. The FIG. 6 embodiment includes all of the features of the FIG. 1 embodiment and the same reference numerals have been used to identify the same features. In addition, however, the device of FIG. 6 has three passive radio frequency identification (RFID) tags 80, 82, 84, shown schematically in the drawings. The tags 80, 82, 84 are conventional and are of the type which, when exposed to the correct RF signal from a reading device, are activated and transmit information held by the tag to the reading device. The first and second tags 80, 83 are embedded in the rear plastics sheet 14 of the device, immediately beneath the first and second status indicating areas 26, 28. The third tag 84 is embedded in the second slide member 30.

In addition, the first slide member 22 is provided with a thin metal layer (not visible) on its undersurface which acts as an electromagnetic shield or screen and prevents the second tag 82 from being interrogated when the slide member 22 is in the first position (FIG. 6(a)) and prevents the first tag 80 from being interrogated when the slide member 22 is in the second position (FIG. 6(b)).

Similarly, the undersurface of the recess 36 in which the second slide member 30 is mounted, is provided with a thin metal layer (not visible) which also acts as an electromagnetic shield or screen and prevents the third tag 84, carried by the second slide member 30, from being interrogated when the second slide member is in its withdrawn position (FIGS. 6(a) and 6(b)).

Each of the tags 80, 82, 84 is arranged to transmit a code when interrogated, which is indicative of the position of the first slide member 22 (tags 80, 82) or the second slid member 30 (tag 84), thereby providing a further, non-visual indication of the condition of the indicator device.

Although three RFID tags 80, 82, 84 have been shown, one or two of the tags may be omitted if desired, if less information is required.

The invention is not restricted to the details of the foregoing embodiments. For example, the slide members could be replaced with movable members which move in a different manner, e.g. pivotally mounted members.

In addition, the indicator device of the present invention is not restricted to use with a dispenser.

The invention claimed is:

1. An indicator device comprising:
   a removably mounted base member;
   a first visual indicator and a second visual indicator;
   a first indicator member mounted on the base member, and being displaceable manually and selectively between (1) a first position indicative of a first condition or state as determined by an observer and in which position the first visual indicator is revealed, and (2) a second position indicative of a second condition or state; state as determined by the observer and in which the second visual indicator is revealed;
   a first electronic tag and a second electronic tag, each of which is configured to-transmit readable information to an interrogation device; and
   a shielding member that moves with the first indicator member and that prevents communication with the first electronic tag when the first indicator member is in its first position and that prevents communication with the second electronic tag when the first indicator member is in the second position.

2. The indicator device as claimed in claim 1, wherein the first indicator member is displaceable in a straight line between its first and second positions.

3. The indicator device as claimed in claim 1, wherein the first indicator member is slidable between its first and second positions.

4. The indicator device as claimed in claim 1, wherein the first indicator member comprises the shielding member.

5. The indicator device as claimed in claim 1, wherein the electronic tag is configured to transmit information indicative of a condition or state.

6. The indicator device as claimed in claim 1, further comprising a second indicator member displaceable into a path of the first indicator member when the first indicator member is in the first position to inhibit displacement of the first indicator member to the second position.

7. The indicator device as claimed in claim 6, wherein the second indicator member is displaceable between a first position in which it does not inhibit the displacement of the first indicator member and a second position in which it inhibits the displacement of the first indicator member to its second position.

8. The indicator device as claimed in claim 7, wherein the second position of the second indicator member is indicative of a third condition or state.

9. The indicator device as claimed in claim 6, wherein the first indicator member is slidable between its first and second positions, and the second indicator member is slidable between its first and second positions.

10. The indicator device as claimed in claim 6, wherein
    the first indicator member reveals a first indicator when it is in its first position,
    the first indicator member reveals a second indicator when it is in its second position, and
    the second indicator member reveals a third indicator when it is displaced into the path of the first indicator member.

11. The indicator device as claimed in claim 6, wherein the first and second indicator members are reversibly displaceable between their first and second positions.

12. The indicator device as claimed in claim 6, wherein the first indicator member is displaceable across the path of the second indicator member when the second indicator member is not displaced into the path of the first indicator member, to inhibit displacement of the second indicator member into the path of the first indicator member.

13. An indicator device comprising:
    a first indicator member displaceable between a first position indicative of a first condition or state and a second position indicative of a second condition or state; and
    a second indicator member displaceable into a path of the first indicator member when the first indicator member is in the first position to inhibit displacement of the first indicator member to the second position,
    wherein the first and second indicator members are both displaceable in a straight line between their respective first and second positions and wherein the second indicator member is displaceable in a direction perpendicular to the direction of displacement of the first indicator member.

14. The indicator device as claimed in claim 13, further comprising:
    an electronic tag that is configured to transmit readable information to an interrogation device; and
    a shield which prevents communication with the electronic tag when the first indicator member is in its first position.

15. The indicator device as claimed in claim 13, further comprising:
    an electronic tag that transmits readable information to an interrogation device; and
    a shield which prevents communication with the electronic tag when the second indicator member is in one of its first and second positions.

\* \* \* \* \*